United States Patent [19]

Willner

[11] 3,778,168

[45] Dec. 11, 1973

[54] APPARATUS FOR THE CONTROL OF TRAVELING CONSTRUCTIONAL IMPLEMENTS

[76] Inventor: Kurt Willner, Kurt Willner Legederstrasse 12, Munster, Germany

[22] Filed: July 22, 1971

[21] Appl. No.: 165,304

[30] Foreign Application Priority Data
July 27, 1970 Germany................. P 20 37 130.6

[52] U.S. Cl................. 356/152, 356/172, 172/4.5
[51] Int. Cl. ........................................ G01b 11/26
[58] Field of Search........................ 356/152, 172; 250/204; 172/4, 2, 4.5

[56] References Cited
UNITED STATES PATENTS

| | | | |
|---|---|---|---|
| 3,046,681 | 7/1962 | Kutzler | 172/4.5 |
| 3,012,469 | 12/1961 | Clayborne | 356/172 |
| 3,375,750 | 4/1968 | Ellis et al. | 356/152 |

Primary Examiner—Benjamin A. Borchelt
Assistant Examiner—S. C. Buczinski
Attorney—Holman & Stern

[57] ABSTRACT

An apparatus for controlling travelling constructional implement using guide planes, comprising a transmitter and receiver device, having at least one transmitter and one receiver connected with the implement, and a reflector fixed to the ground, the reflector having the properties of a plane mirror adapted to reflect radiation between the transmitter and the receiver means.

11 Claims, 13 Drawing Figures

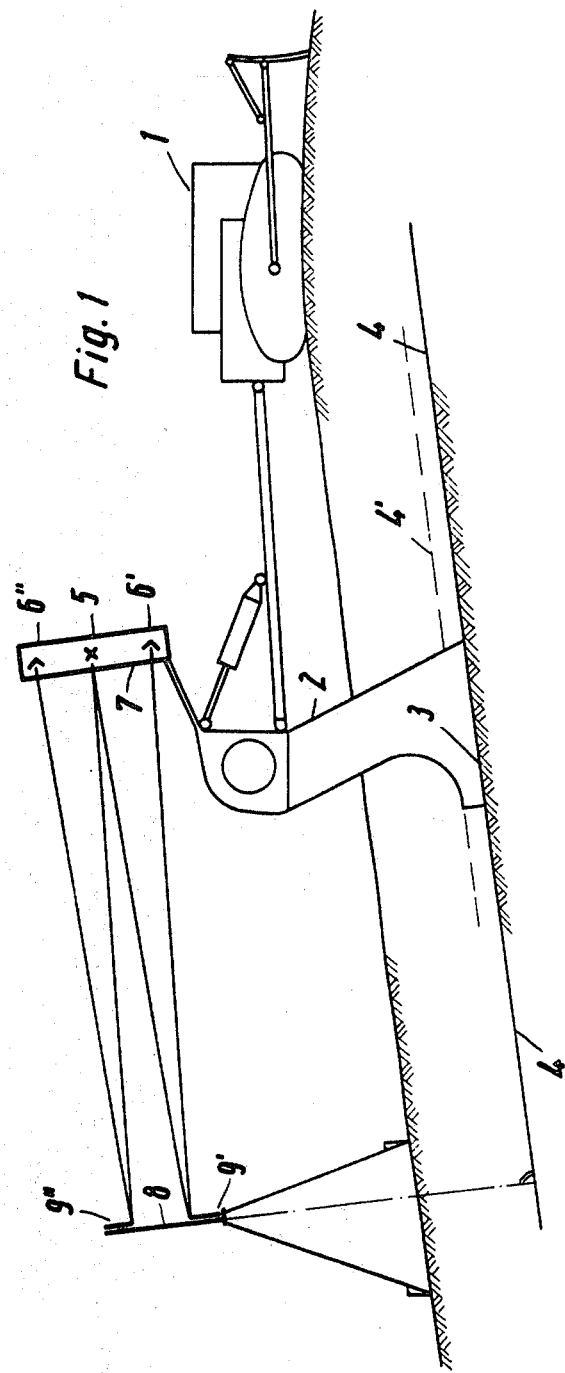
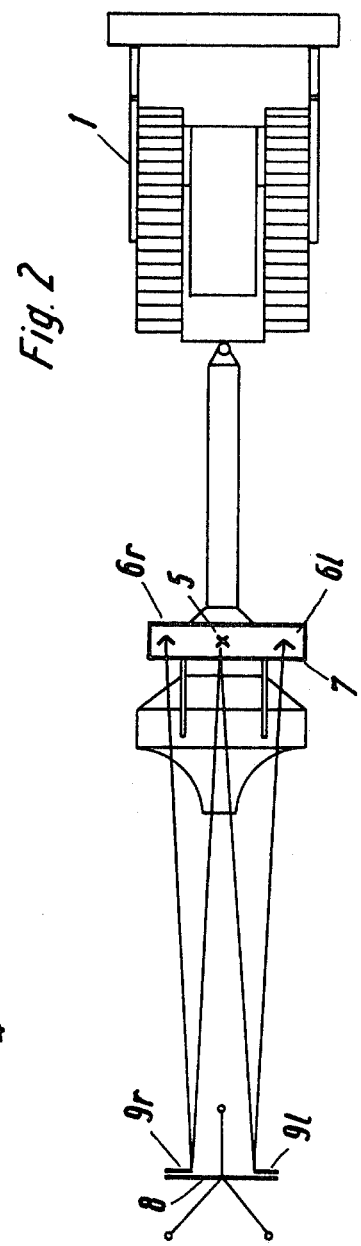
Fig.1
Fig.2

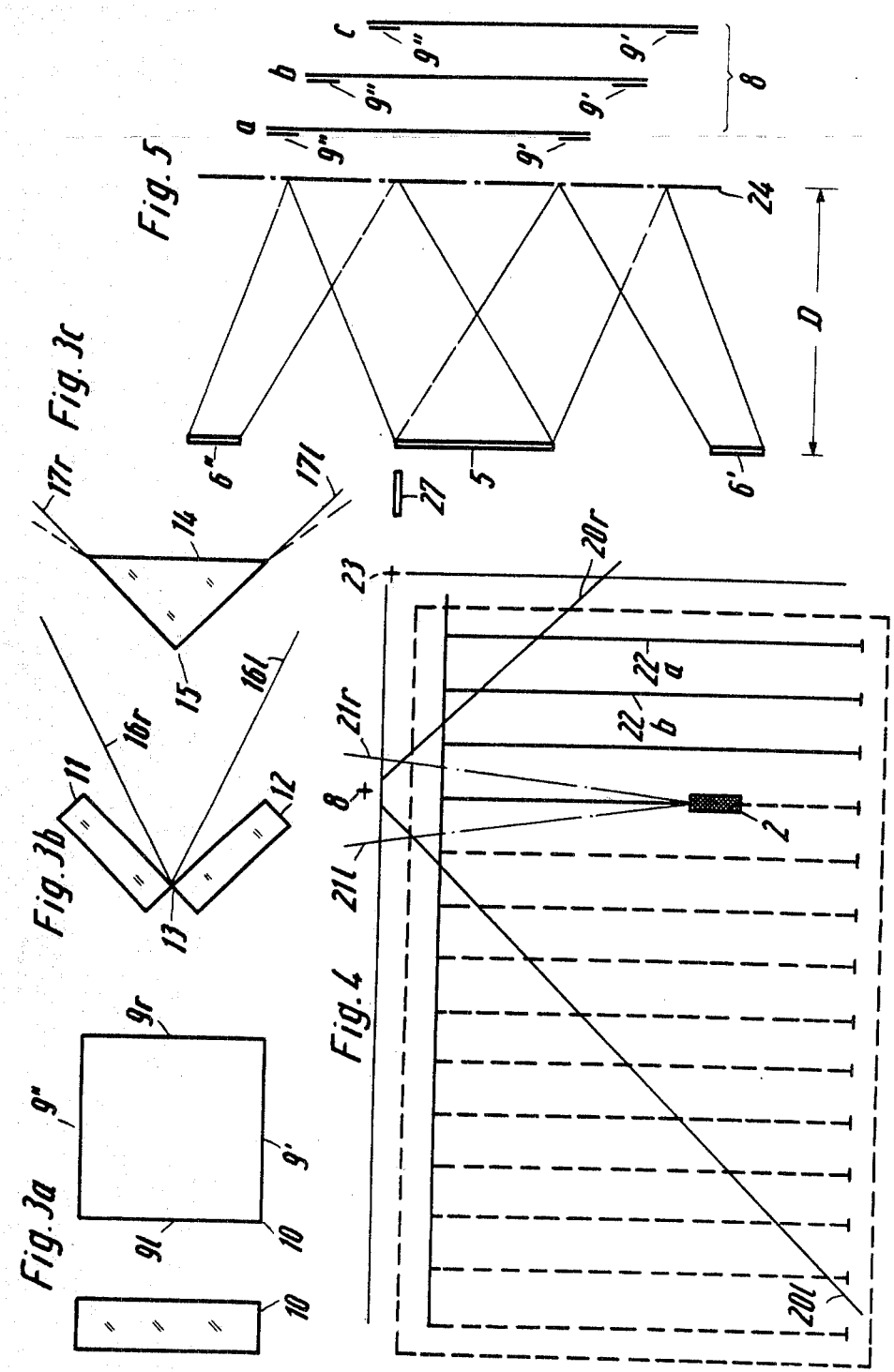

APPARATUS FOR THE CONTROL OF TRAVELING CONSTRUCTIONAL IMPLEMENTS

BACKGROUND OF THE INVENTION

The present invention relates to apparatus for the control of travelling constructional implements, for example mole or drainage ploughs, bulldozers and graders. The invention consists in an apparatus for controlling travelling constructional implements using guide planes, comprising a transmitter and receiver device, having at least one transmitter and one receiver connected with the implement, and a reflector fixed to the ground, the reflector having the properties of a plane mirror adapted to reflect radiation between the transmitter and the receiver means.

For the control of such implements mirror or prism systems are used in accordance with the invention which only function as a flat mirror normal to the target plane and divert rays in a plane parallel to the target plane independently of twisting movements through 180° about a axis normal to this plane; use is made of mirror or prism systems which are characterised by a sector-like range of operation with a large aperture.

For the purpose of controlling the constructional implement in a direction parallel to the target plane the apparatus can be provided with limiting means, for example in the form of adjustable stops, for controlling the reflector in a direction parallel to the target plane in such a manner that the normal planes generated by the reflecting faces with its limiting apertures determine the desired guide planes. The guide planes can be arranged in any desired manner, for example horizontally or vertically, in space; using reflectors with the property of plane mirrors it is possible also to form guide planes which are arranged at angles to each other, for example at right angles to each other and thus make possible control or steering in accordance with an axis.

The working tool of the constructional implement is either provided with a pair of transmitters and one receiver or preferably with one transmitter and one or more pairs of receivers. If the apparatus is operated with visible rays, the rays are modulated to distinguish them from daylight.

The pairs of transmitters or receivers are arranged at a distance between them which is preferably twice as large as the spacing between the limiting means determining the guide planes. The receivers can equally well be arranged on both sides or only on one side of the associated transmitter or the transmitters can be arranged on both sides or only on one side of the associated receiver.

In the case in which parts of constructional implements always keep to the target plane the transmitters and the receivers can also be arranged separately, for example in such a manner that the transmitters are connected with the parts which keep themselves to the target plane while the receivers are connected with the working tool.

The means in accordance with the invention can be operated with rays in the visible or invisible ranges; in the receivers photoelectric transducers can be used. As such photoelectric transducers it is possible to make use of photoelements, photoresistors, photodiodes or phototransistors.

For the amplification and evaluation of the electric currents influenced by the incidence of light it is possible to use a number of different circuits, whose choice, however, does not influence the basic functions of the arrangement. For distinguishing, them from daylight, the rays of the transmitter can be modulated.

The arrangement of pairs of transmitters or of receivers at a distance apart equal to twice the distance between the limiting means defining the guide planes of the reflector is due to the fact that the reflector has the properties of a flat mirror in a direction normal to the guide planes, so that in the target position of the transmitter-receiver means the receivers are located in the middle of the penumbra zones, which are formed in the reflected ray path defined by limiting means of the reflector; the receivers therefore receive the same luminous flux density of incident radiation in the target position if the transmitters have the same luminous intensity of radiation.

In the case of a departure from the target position the luminous flux densities of radiation are modified in opposite directions but with the same magnitude; the sum of the luminous flux densities thus remains the same; their difference between them changes in the case of departures from the target position by an amount corresponding to twice the magnitude of the departure, inpendently of the absolute value of the radiation intensities.

In accordance with the invention there is the further provision that the rays of the transmitter are collimated in order to increase the range not only in a direction parallel to the target plane but also perpendicularly to it, that is to say in the direction of control or steering, and in this respect optical components can be used which have substantial dimensions in the direction of the control; in this case, however, the sensitivity of response of the apparatus is not reduced. Collimation can be carried out in such a manner that the angular field of the collimated ray is greater than the departures in inclination or direction to be expected of the transmitter-receiver device of the apparatus; preferably spherical converging lenses for collimation of the rays are used.

If the apparatus is for example equipped with two transmitters and one receiver, the receiver receives radiation from both transmitters, the transmitters have the same luminous intensity of radiation. The rays of the two transmitters are modulated; for this purpose use is preferably made of a sector or chopper disc with an uneven number of vanes, which cut off and allow to pass the radiation from the upper and the lower transmitters in opposite phase relationship so that the radiation of the two transmitters reflected to the receiver, is complemented additively, this complementing action occuring in accordance with the parts of the light allowed to pass by the stops of the reflector of the lower and the upper transmitter respectively. In the target position the receiver receives the luminous flux of both transmitters via the reflector. If the chopper disc is so constructed that it covers over or uncovers the transmitters in intervals of the same duration, in the target position there is an additive complementing action to form even radiation; if the disc is for example constructed in such a manner that the intervals for the uncovering and shutting off the radiation differ, the light pulses of both transmitters, reflected onto the receiver, becomes complemented or integrated to form radiation of a different frequency modulation The means therefore make possible a particularly reliable detection of the target position. In the case of departures from the target position in an upward or a downward direction one receiver receives more light, and the light pulses on the upper or the lower receiver respectively have a phase displacement in accordance with half the pitch of the chopper disc. By making a comparison with the phase position of the chopper disc it is possible to determine whether the dominating phase corresponds to a displacement of the transmitter and receiver device upwards or downwards. This can for example be carried out by means of a further photoelectric or magnetic pulse generator adjacent to the chopper disc.

If the transmitter and receiver device is provided with one transmitter and a pair of receivers, the potential difference of the electric currents is formed, which are produced in the photoelectric transducers of the upper and the lower receiver. This difference is zero in the target position and is distinguished by opposite polarities in the case of positional displacement upwards or downwards. If the intermittent DC is converted into AC, a phase reversal is produced from the change in polarity. The origin of the respective polarity or of the respective phase is determined by comparing with the polarity or the phase of the current of a further photoelectric transducer, which receives light steadily from the transmitter even in the case of positional displacements. Such a transducer preferably receives light directly from the transmitter; in the case of a suitable arrangement it can, however, receive light indirectly via the reflector. In accordance with the invention the quantitative change in the currents, which is brought about by displacement of the transmitter and receiver device in the photoelectric transducers, is converted into qualitative changes in the currents produced in these transducers and these changes are used for the control of the working tool.

Reflectors which in all directions have the properties of a plane mirror, make it possible to operate implements in accordance with the line of intersection of two guide planes, which for example are arranged at right angles to each other. In this case the transmitter-receiver device is either provided with one receiver and two pairs of transmitters arranged at right angles to each other or, preferably with one transmitter and two pairs of receivers arranged at right angles to each other.

If in the case of such reflectors the transmitter and receiver device is provided with one receiver and two transmitters or with one transmitter and two receivers all movements of the implement only within their own width is possible. For the control of implements, which also carry out lateral movements in their working plane they require substantial breadth dimensions and are unsuitable for such implements.

For the control of such implements mirror or prism systems are used in accordance with the invention which only function as a flat mirror normal to the target plane and divert rays in a plane parallel to the target plane independently of twisting movements through 180° about a axis normal to this plane; use is made of mirror or prism systems which are characterised by a sector-like range of operation with a large aperture.

Preferably use is made of mirrors with a 90° angle between them or 90° prisms with reflecting sides defining the right angle: they are set with the line of intersection of their reflecting surfaces normal to the target plane, though it is also possible to make use of other mirror or prism systems with the abovementioned properties, for example pentagon double prisms, as reflectors.

As compared with mirror systems prisms have the advantage of an effective field with a larger angular field or larger aperture. At the margins of the ray path their useful breadth becomes less and the luminous flux reflected by them undergoes a reduction varying inversely with the refractive index of the glass used. In accordance with the invention 90° prisms are used made of a type of glass with a high refractive index, for example dense flint.

Prisms are particularly suitable as reflectors for the control of travelling implements, which carry out lateral movements within their target plane. Their use for control purposes, however, makes it necessary for the collimated beam or ray of the transmitter to cover them from every position of the implement.

In order to use the devices also for implements with a direction of operation which is independent of the reflector, transmitter-receiver devices connected with the working tool of the implement are so constructed in accordance with the invention that they are automatically directed towards the reflector despite movements and changes in the position of the implement. In this respect it is taken that the reflector acts as a ray emitter in all changes in direction of the transmitter-receiver device, that is to say in the case of all lateral movements of the implement.

For the purpose of simultaneous correction of the vertical position and the lateral alignment towards the reflector the transmitter-receiver device is preferably provided with a single transmitter and two pairs of photoelectric transducers; of these pairs of transducers one pair serves for lateral alignment of the transmitter and receiver device and the other pair serves for correction of the vertical position, as already described.

The receivers can be equipped with converging lenses and the latter are so arranged that their optical axes are parallel to the axis of the collimated beam or ray of the transmitter. Preferably cylindrical lenses are used and arranged in such a manner that they collimate the reflected rays only parallel to the target plane. The transducers serving for lateral alignment of the transmitter-receiver device on the reflector are arranged symmetrically in relation to the optic axis of these lenses.

If the transmitter-receiver device is aligned with the optic axis of these lenses so as to be directed at the reflector, the photoelectric transducers, which serve for lateral alignment, receive equal luminous intensities independently of whether the transmitter-receiver device normal to the target plane, that is to say in the direction of control, is in its target position or not. The difference between the luminous flux incident intensities on the two photoelectric transducers is in this case zero. When the reflector is to the side of the optic axis of these lenses, the luminous flux incident on the one or the other of the transducers predominates.

In the case of departures of the transmitter-receiver device from the target direction there are thus, in a similar manner, different amounts of radiation received by the photoelectric transducers, as is the case with departures of the transmitter-receiver device normal to the target plane. The currents produced are evaluated in a suitable manner and used for lateral alignment of the transmitter-receiver device so as to be directed at the reflector.

The invention will now be described with reference to the accompanying diagrammatic drawings in which the invention is described by way of example in conjunction with a mole plough.

FIG. 1 shows the basic arrangement of the device in accordance with the invention with a mole plough in longitudinal section.

FIG. 2 shows the construction of the device for lateral control of the mole plough in plan view.

FIGS. 3a, 3b, 3c show different constructions of the reflector of the device in elevation and in section.

FIG. 4 shows the plan of the field of operation of a plough in accordance with FIG. 1.

FIG. 5 is a longitudinal section of a possible ray path between the reflector and the transmitter and receiver device.

Figure 7:
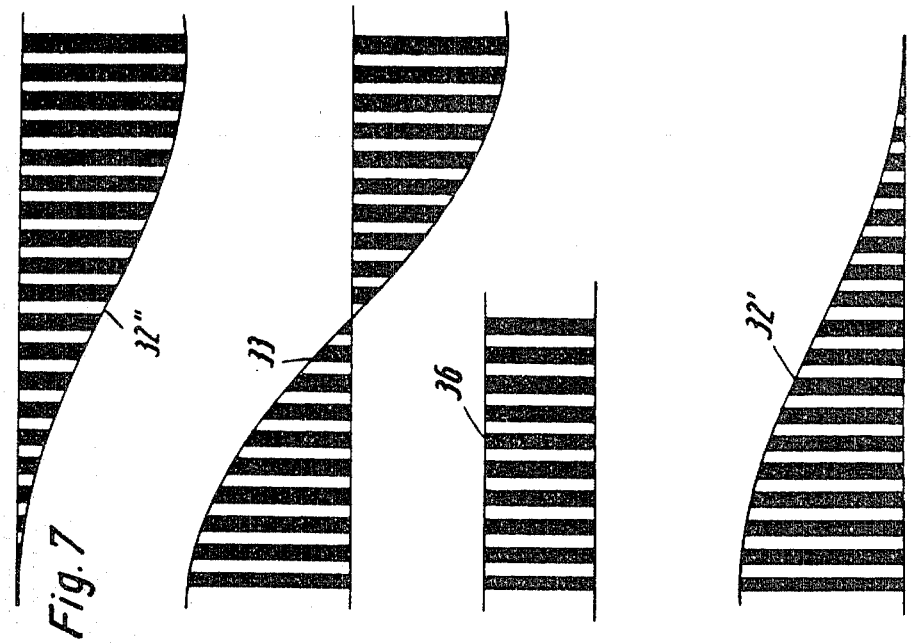
FIG. 7 shows diagrammatically the series of pulses in the case of a change in the position of the transmitter and receiver device in relation to the stops of the reflector.

A tractor 1 shown in its starting position in FIG. 1 has a mole or drainage plough 2 hitched to it. The plough body 3 is to follow the line 4. The beam of the plough carries a device comprising a transmitter 5 and a receiver 6'.

On the ground a reflector 8 is arranged which in a direction normal to the target line 4 has the properties of an flat mirror. It is provided with a stop 9' whose edge is arranged the same distance above the target line as the center point between the transmitter 5 and the receiver 6' is arranged above the plough body 3.

When the body 3 is above the target line 4, the rays of the transmitter are reflected by the reflector 8 onto the receiver 6'; they are interrupted when the plough body sinks below the target line; the pulse change is used for controlling the plough in accordance with the on - off principle; the arrangement operates as a two point regulation system.

If the device 7 of the plough is equipped with a further receiver 6'' and the reflector 8 is provided with a further stop 9'' and the stop is so arranged that its edge is the same distance above the line 4', which is moved upwards to allow for tolerances, as the center point between the transmitter 5 and the receiver 6'' is above the body of the plough, the radiation or ray of the transmitter 5 intended for the receiver 6'' is interrupted as soon as the body of the plough crosses the tolerance line 4'. The pulses of the receivers 6' and 6'' are used for controlling the plough in accordance with the evaluating circuitry for three point regulation or continuous regulation.

FIG. 2 shows a further addition to the device for lateral control of the mole plough in accordance with FIG. 1 in plan view. This device resides in that the transmitter-receiver device 7 is provided with a pair of further receivers 6 r (on the right) and 6 l (on the left) and the reflector 8 also has lateral stops 9 r und 9 l. The lateral spacing between the receivers 6 r and 6 l is twice as large as the lateral distance between the stops 9 r and 9 l. If the plough becomes displaced to the side of the target line, the reflected radiation intended for the left or the right receiver is not received. The pulses produced on this occasion are used to steer the tractor 1 to one side or the other.

FIGS. 3a, 3b, 3c show different constructions of the reflector of the device.

FIG. 3a shows in elevation and section a flat or plane mirror 10, which is limited above and below by stops 9'' and 9' and laterally by stops 9 r and 9 l.

FIG. 3b shows a section through plane mirrors 11 and 12 which being normal to the target plane make a right angle with it and with the line 13, in which the mirror surfaces intersect, are aligned so as to be normal to the target plane. 16 l and 16 r denote approximately the useful limits of the reflected rays.

FIG. 3c shows a 90° prism 14 with mirror surfaces adjacent to the right angle and whose edge 15 is also aligned so as to be normal to the target plane. It is best made of a type of glass with a high refractive index. The approximate useful limits of the reflected rays are denoted by 17 l and 17 r; they include a sector with a wide angle, which can be made even wider by additional angle mirrors or additional angle prisms. As a result of this the range of application of devices in accordance with the invention can be still further increased. The limit is constituted by a reflector which consists for example of a cylindrical carrier with mirror or prism systems arranged on the periphery of its cylindrical envelope.

The field of work of a mole plough as shown in FIG. 1 is denoted diagrammatically in FIG. 4.

The reflector 8 of the device is arranged in front of or behind the mole plough 2 in its direction of movement. In accordance with FIG. 3b or 3c the reflector allows lateral movements of the mole plough between the lines 20 l and 20 r. However, it is important in this respect that the collimated ray 21 l and 21 r of the transmitter includes the reflector for every position of the mole plough. When the drainage elements 22a, 22b . . . etc. of such a field of work are arranged in a common plane, for example inclined in the longitudinal and transverse directions, if the reflector is arranged as a suitable place and if there is a suitable construction of the transmitter-receiver device connected with the working tool in order to bring about automatic alignment of the device so as to point at the reflector, it is possible to cover the whole working field without having to reset the reflector. Such a location is denoted by reference numeral 23 for a reflection made up of a single 90° angle prism.

In the case of a device with one transmitter and two receivers FIG. 5 shows the possible ray path between the reflector and the transmitter-receiver device in longitudinal section. The transmitter and the receivers are denoted by reference numerals 5, 6' and 6''; in contrast to the arrangement of FIG. 1 the dimensions effective in the direction of control are shown. The reflector 8 with the stops 9' and 9'' is shown in relation to the transmitter-receiver device in three different vertical settings or positions:

a. transmitter-receiver device too low;
b. in the target position;
c. too high.

The position of the reflector in relation to its spacing (D) from the transmitter-receiver device is denoted by reference numeral 24. The device is, as already described, operated with modulated radiation; independently of changes in the relative position of the reflector and the transmitter-receiver device, this radiation always has the same effect on the photoelectric transducer 27 associated with the transmitter.

From the drawing it can be seen that in the case of the position (a) of the refelctor in relation to the transmitter-receiver device only the upper receiver 6'' is acted upon by the transmitter 5 or source of radiation and in the position (c) of the reflector only the bottom receiver 6' is acted upon in this manner. For the target position denoted by (b) and positions adjacent to it the parts of the reflected radiation of the transmitter and passing to the upper and the lower receivers are determined by the respectiveposition of the stops delimiting the reflector.

Figure 6:
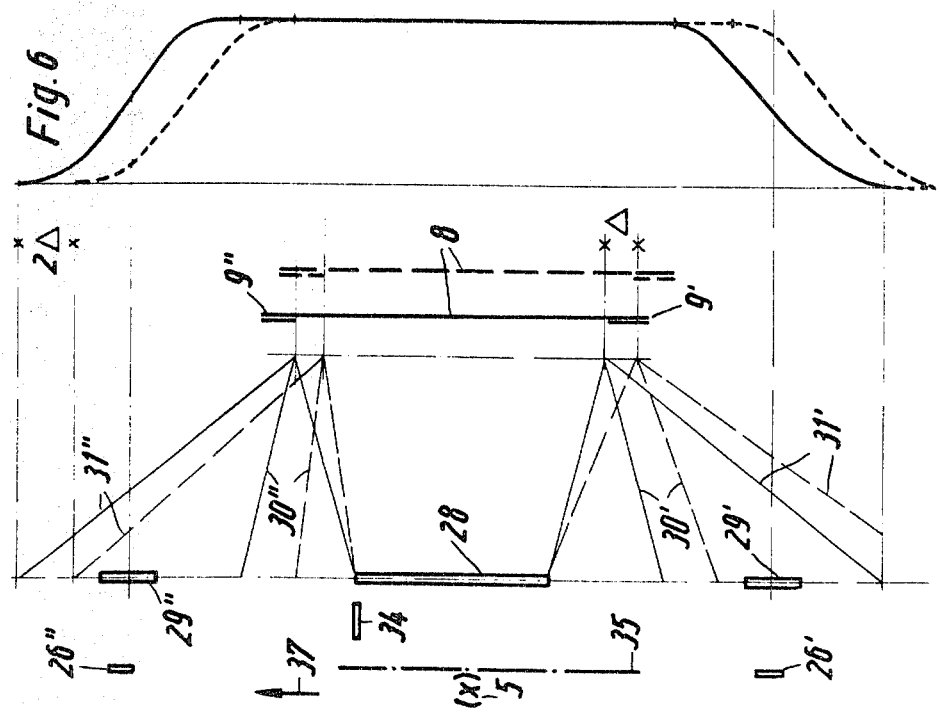
FIG. 6 shows the field of the reflected rays with a diagrammatic representation of the luminous intensities.

In FIG. 6 the field of the reflected rays for a device equipped with one transmitter and two receivers is shown in longitudinal section. Reference numerals 5, 26' and 26'' denote transmitters and the transducers of the receivers; the respective lenses are denoted by reference numerals 28, 29' and 29''. The reflector is shown in two positions and denoted by reference numeral 8; its stops have the reference numerals 9' and 9''.

The drawing indicates in full lines the passage of rays in the target position of the transmitter-receiver device; it shows that in this respect between the rays 30' and 30'' there is a full illumination, while outside the rays 31' and 31'' no radiation falls on the transmitter-receiver device owing to limitation of the reflector. Between the rays 30' and 31' and between the rays 30'' and 31'' respectively there are penumbra regions with a characteristic variation in luminous intensities, which is shown for the target position on the right-hand side of FIG. 6.

Owing to the arrangement of the receivers at twice the spacing of the stops of the reflectors the centers of both receivers are located at the position of maximum change in the luminous intensities.

A change in position of the transmitter-receiver device in relation to the reflector is shown in broken lines in the drawing. In accordance with the laws of reflection the fields of the reflected rays move in opposite directions. In the case of movement as indicated by arrow 37 of the transmitter-receiver device upwards at the position shown in broken lines of the reflector the lower receiver passes into the region of greater luminous intensity while the upper receiver passes into the region of the lesser luminous intensity. Accordingly in the case of movement of the transmitter-receiver device opposite to the direction denoted by arrow 37, that is to say downwards the upper receiver passes into the region of greater luminous intensities and the lower receiver into the region of lesser luminous intensities. These are shown for the indicated stop positions on the right-hand side of the drawing as well. It can be seen that in the case of movement as indicated by arrow 37 the luminous intensities of the upper receiver decrease to the same degree as the luminous intensities of the lower receiver increase; in the case of changes in position in the transmitter-receiver device their sum remains constant within the limits of the control range. On the other hand, their difference increases with a magnitude corresponding to twice the distance of the departure or displacement.

FIG. 7 shows the characteristic of luminous intensities of both receivers on the assumption that the movement is carried out evenly and begins at a position of the reflector in which the upper receiver is just contacted by the marginal rays 31''. The representation is based on the assumption that the radiation is modulated in a pulse ratio of 1 to 1. The representation shows the change with time during the transition from one limiting position to the other diagrammatically.

The intermittent DC signals produced in the photoelectric transducers have, with the above assumption, the same characteristic as the luminous intensities incident on the receivers. The current characteristic is denoted by reference numeral 32'' for the upper receiver and by reference numeral 32' for the lower receiver.

If the potential difference of the intermittent DC signals produced in the photoelectric transducers is formed, it will have the characteristic shown by reference numeral 33; on passing through the target position the polarity is changed. If pulsed light is being used as described above, there is a phase reversal on passing through the target position.

Figure 10:
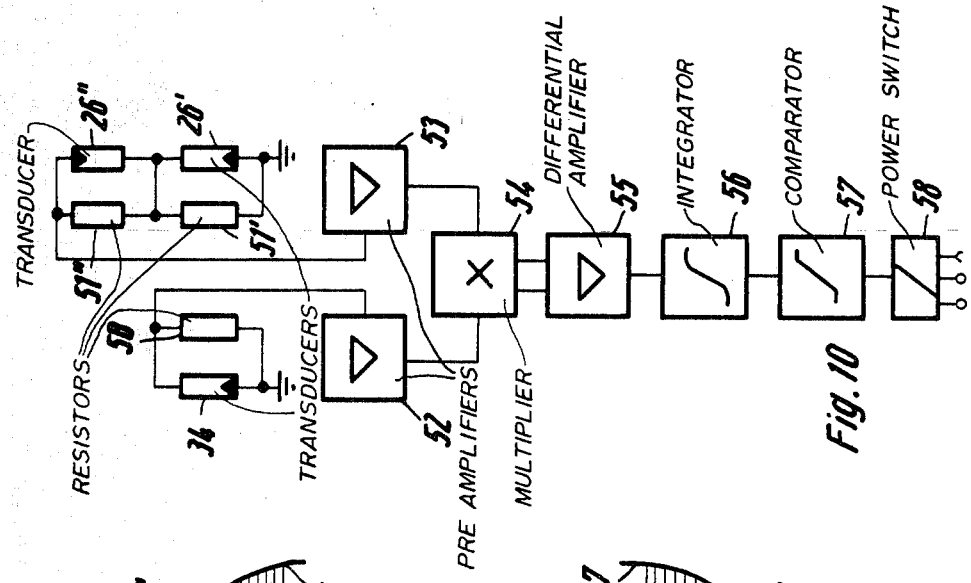
FIG. 10 shows a circuit diagram of the electronic evaluating circuitry.

A possible embodiment of the circuitry of the transducers is shown in FIG. 10.

Whether the instantaneous polarity or the instantaneous phase represents an excessively high or an excessively low position of the transmitter-receiver device can be seen from a comparison with the phase of a further photoelectric transducer 34 which receives light directly from the transmitter; under the influence of a chopper disc 35 this transducer receives the radiation of the transmitter in the same phase as the whole field of radiation.

The associated characteristic of the current produced in the transducer 34 is shown in FIG. 7 so as to make a comparison with the current characteristic 33 and is denoted by 36. The comparison shows that with the present assumptions the polarity in accordance with line 33 at an excessively high position of the transmitter-receiver device is identical with the polarity in accordance with line 36, while at a position which is excessively low it departs from this. The same applies as regards the phase in the case of conversion into AC.

The relationships represented in FIGS. 6 and 7 also apply *mutatis mutandis* for devices which are equipped with one receiver and two transmitters though subject to the provision that in the photoelectric transducer of the receiver currents are directly produced, which differ as regards their phase, when the position of the transmitter-receiver device is moved upwards or downwards.

Figure 8:
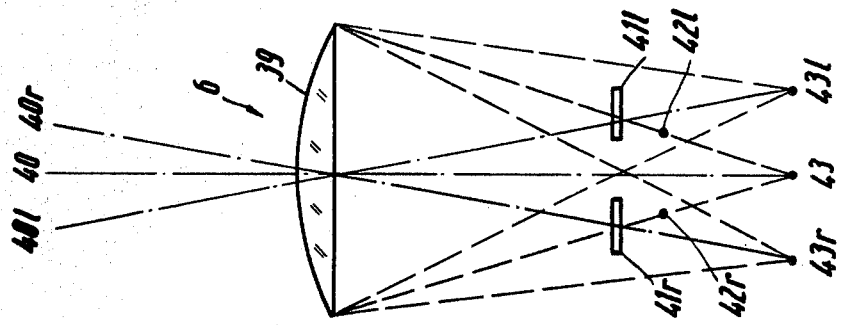

The use of the field of the reflected rays for the purpose of lateral alignment of the transmitter-receiver device to be directed at the reflector is explained for a device which is equipped with one transmitter and two pairs of photoelectric transducers, with reference to the drawings of FIGS. 8 and 9.

FIG. 8 represents a horizontal section through a receiver 6, which is preferably so arranged between the lower receiver 6' and the upper one 6'' that even in the case of vertical displacements of the transmitter-receiver unit does not come into the penumbra regions in accordance with FIG. 6. It is provided with a converging lens 39 whose optic axis 40 is parallel to the axis of the collimated ray of the transmitter. Symmetrically in relation to the axis 40 the photoelectric transducers 41 l (on the left) and 41 r (on the right) are arranged to serve for aligning the transmitter-receiver device so as to be directed to the reflector operating parallel to the target plane as a transmitter. If for the receiver 6 a spherical lens is used, the transducers 41 l and 41 r are arranged at such a distance from their focal plane that even in the case of changes in inclination of the transmitter-receiver device they remain within the collimated ray; preferably a cylindrical lens is used, since such a lens is independent from changes in inclination of the transmitter-receiver device.

If the reflector is located in the axis 40, its image is located in the position 43; the associated marginal rays are denoted by reference numerals 42 l and 42 r. Since the transducers 41 l and 41 r are arranged symmetrically in relation to the axis 40, they receive the same radiation as long as the reflector is located in this axis. If the transmitter-receiver device is, instead of this arrangement, aligned with the line 40 r directed towards the reflector, the image of the reflector has the position 43 r; in this case more light is received by the transducer 41 r than the transducer 41 l. In a corresponding manner the transducer 41 l receives more light than the transducer 41 r when the transmitter-receiver device is directed so that the line 40 l is directed on the reflector.

The transducers 41 l and 41 r are so arranged that on one or the other side they receive their full amount of light at an angle between the lines 40 r and 40 l which is less than the angular aperture of the collimated beam or ray of the transmitter. They are preferably so arranged that in the case of axial alignment of the transmitter-receiver device so as to be directed as a reflector their center points lie in the edge rays of the length 39 so that in the case of lateral departures of the transmitter-receiver device they are subject to opposite modifications of the strength of illumination, the modification being, however, of the same magnitude.

If in accordance with the invention the potential difference of the elctric currents produced in the photoelectric transducers 41 l and 41 r, in the case of a change in the alignment of the transmitter-receiver, device in a direction of the line 40 r or 40 l opposite polarities are formed. If the intermittent DC produced in the photoelectric transducers by the action of the light or radiation is converted into AC, there is a phase reversal in the case of a change of alignment of the transmitter-receiver device from the reflector on line 40 r to an alignment along line 40 l.

The correspondence between the actual polarity or actual phase of the current and the side, left or right, is determined by a comparison with the polarity or the phase of the current, which is produced, for example in a further photoelectric transducer 34 which is not effected by changes in height or direction of the transmitter-receiver device.

Instead of arranging the photoelectric transducers, which serve for the correction of lateral departures, in a separate receiver as described, it is also possible to arrange them in common with the transducers, which serve for correcting departures in height.

Figure 9A:
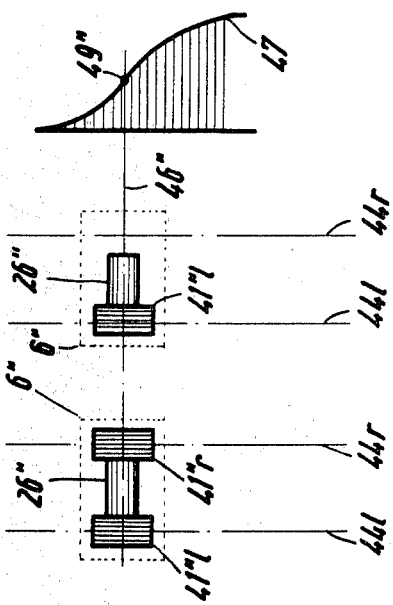
FIGS. 8 and 9a and 9b show various constructions of the receivers for aligning the transmitter and receiver device so as to be directed towards the reflector.
Figure 9B:
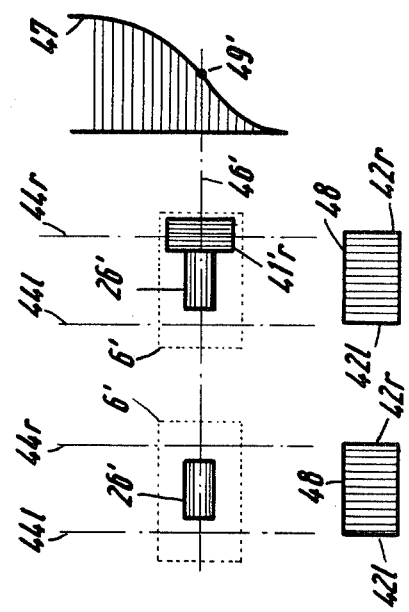

Examples as such arrangements are shown in a plan view of the transducers for the upper receiver 6'' and the lower receiver 6' in FIGS. 9a and 9b and a comparison is made with the field of the reflected rays and the rays made to converge by cylindrical lenses. The center lines for the transducers 41'' l and 41'' r are denoted by reference numerals 44 l and 44 r; the center line for the transducers 26'' and 26' serving for the correction of vertical departures are denoted by reference numerals 46'' and 46'. The field of the reflected and collected beams is denoted for the target position; it is denoted by reference numeral 47 with reference to height and by reference numeral 48 with reference to the horizontal.

In the target position the center lines 44 l and 44r coincide with the marginal rays 42 l and 42 r in accordance with FIG. 8; the center lines 46'' and 46' lie at the positions 49'' and 49' of the maximum changes in the intensities of illumination. If the transmitter-receiver device departs laterally from the target direction, the intensity of illumination of the transducers 26'' and 26' remains unchanged; the intensities of illumination in the case of the transducers 41'' l and 41'' r and 41' r respectively undergo changes in the opposite directions as already mentioned.

Changes in height of the transmitter-receiver device involve changes in the illumination intensity for arrangement in accordance with FIG. 9a in the transducers 41'' l and 41'' r as well which serve for lateral or horizontal alignment, though these changes are of the same magnitude so that their direction of control is not influenced by changes in height of the transmitter-receiver device. On the other hand, if the transducers 41''l and 41'r serving for lateral alignment are arranged in accordance with FIG. 9b on the upper and lower receivers, departures in height of the transmitter- and receiver devices bring about changes in the intensity of illumination in these transducers 41'' l and 41' r, so that they firstly give signals also for lateral alignment. Since their range of control includes a smaller angle than the collimated beam or ray of the transmitter the regulating operation is not disturbed by this.

For the correction of departures in height an example is shown for the circuitry of the photoelectric transducers in FIG. 10. In this arrangement photoelements are used for the transducers.

The transducers 26'' and 26' serving for the correction of departures in height are connected with their polarities opposite to each other and connected in parallel with resistances 51'' and 51'. In a corresponding manner the transducer 34 which always receives the same mode of radiation is connected in parallel with a resistor 50. The potential difference of the transducers 26'' and 26' is equal to zero in the case of the same illumination and in the case of different illumination assumes a magnitude, whose prefix sign is determined by the direction of the departure. The signal for the departure from the target position thus runs from a negative value through zero to a positive value for the voltage given. The latter is compared with the voltage of the current, which is supplied by the transducer 34 whose illumination does not undergo any changes.

The following regulating devices is shown diagrammatically. Reference numeral 52 denotes the amplifier for the transducer 34 while reference numeral 53 denotes the amplifier for the potential difference of the transducers 26'' and 26'. Furthermore, 54 denotes a phase comparison circuit 55 signal amplifier, 56 an integrator, 57 a threshold value switch and 58 an output relay.

The transducers serving for correction of lateral or horizontal departures can be connected in a corresponding manner. However, it is in principle possible to use other circuits for the evaluation of the changes in illumination, which are produced in the case of departures from the target position in the devices in accordance with the invention.

I claim:

1. An apparatus for controlling travelling constructional implements working on a site in association with a target line and corresponding target plane, and using guide planes, said apparatus comprising: a working tool including transmitter and receiver means, said transmitter and receiver means being composed of at least one transmitter and one receiver; reflecting means disposed on the working site which reflecting means has the properties of a plane mirror and is arranged perpendicular to said target line so that it reflects light between at least said one transmitter and said one receiver, said reflector means having its reflective capabilities limited in a direction substantially parallel and substantially vertical to the target plane by stop means, which stop means defines comprises a pair of lateral members and a pair of substantially vertical members peripherally disposed in relation to said reflector means, and wherein either the transmitters or the receivers of said transmitter or receiver means are arranged in pairs, laterally and substantially vertically on said working tool at a mutual spacing, which spacing is twice the distance between the vertical and lateral members disposed in relation to said reflector means.

2. An apparatus in accordance with claim 1 comprising converging lenses for collimating rays used.

3. An apparatus in accordance with claim 2 comprising a light transmitting means adapted to modulate the light, and photoelectric transducing means.

4. A device in accordance with claim 3 comprising a photoelectric transducer adapted to receive the same quantity of illumination independently of changes in position of the transmitter and receiver means.

5. An apparatus in accordance with claim 4 in which when two transmitters are arranged in pairs, the two transmitters differ in their phase of modulation.

6. An apparatus in accordance with claim 5 in which the current produced in the photoelectric transducer of the receiver means can be compared in accordance with its phase of modulation with the phase of the current which is produced in the photoelectric transducer.

7. An apparatus in accordance with claim 4 with the receivers arranged pairwise and comprising photoelectric transducers, in respect of whose current a potential difference is formed and the potential difference can be compared in accordance with its polarity or phase with the polarity or phase of the current which is produced in the photoelectric transducer.

8. An apparatus in accordance with claim 1 in which the reflecting means is adapted to reflect light falling on it back parallel to the direction of incidence independently of a turning movement about an axis normal to the target plane.

9. An apparatus in accordance with claim 8 in which the reflecting means comprises reflecting surfaces set at 90° to each other.

10. An apparatus in accordance with claim 9 in which the reflecting means is a prism made of a glass with a high refractive index.

11. An apparatus in accordance with claim 7 in which the receiver means comprises converging lenses whose optic axes are parallel to the axis of the collimated ray emitted by the transmitter and there is a further pair of photoelectric transducers which are arranged on both sides of the optic axis of the collecting lenses symmetrically.

* * * * *

UNITED STATES PATENT OFFICE
CERTIFICATE OF CORRECTION

Patent No. 3778168  Dated December 11, 1973

Inventor(s) Kurt Willner

It is certified that error appears in the above-identified patent and that said Letters Patent are hereby corrected as shown below:

[76]  Inventor:  Kurt Willner,
    44 Münster, Tegeder Strasse 12,
    West Germany Signed and sealed this 16th day of July 1974.

(SEAL)
Attest:

McCOY M. GIBSON, JR.  C. MARSHALL DANN
Attesting Officer  Commissioner of Patents